United States Patent
Surnilla et al.

(10) Patent No.: US 9,255,513 B2
(45) Date of Patent: Feb. 9, 2016

(54) EXHAUST AIR INJECTION

(75) Inventors: Gopichandra Surnilla, West Bloomfield, MI (US); Giovanni Cavataio, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 347 days.

(21) Appl. No.: 13/481,185

(22) Filed: May 25, 2012

(65) Prior Publication Data

US 2013/0312407 A1 Nov. 28, 2013

(51) Int. Cl.
*F01N 3/00* (2006.01)
*F01N 3/10* (2006.01)
*F01N 3/22* (2006.01)
(Continued)

(52) U.S. Cl.
CPC ............... *F01N 3/22* (2013.01); *F01N 3/0814* (2013.01); *F01N 3/0871* (2013.01); *F01N 3/30* (2013.01); *F02B 37/00* (2013.01); *F02D 41/0002* (2013.01); *F02D 41/0055* (2013.01); *F02D 41/1475* (2013.01); *F01N 3/101* (2013.01); *F01N 3/2066* (2013.01); *F01N 13/009* (2014.06); *F01N 2260/022* (2013.01); *F01N 2270/02* (2013.01); *F01N 2560/02* (2013.01); *F01N 2560/025* (2013.01); *F01N 2560/06* (2013.01); *F01N 2560/14* (2013.01); *F01N 2610/02* (2013.01); *F01N 2900/0416* (2013.01); *F01N 2900/1402* (2013.01); *F01N 2900/1404* (2013.01); *F01N 2900/1602* (2013.01); *F01N 2900/1622* (2013.01); *F02D 41/0077* (2013.01); *F02D 2200/0802* (2013.01); *Y02T 10/144* (2013.01); *Y02T 10/22* (2013.01); *Y02T 10/42* (2013.01); *Y02T 10/47* (2013.01)

(58) Field of Classification Search
CPC ............................................. F01N 3/22–3/326
USPC ........... 60/272, 273, 278, 280, 285, 289, 290, 60/293, 297, 298, 301, 307, 605.1, 605.2, 60/606; 701/108
See application file for complete search history.

(56) References Cited

U.S. PATENT DOCUMENTS 4,503,829 A * 3/1985 Hasegawa ............... F02D 41/32
 123/492
5,461,857 A 10/1995 Itou et al.
(Continued)

FOREIGN PATENT DOCUMENTS

EP 1184556 A2 8/2001

OTHER PUBLICATIONS

Cavataio, Giovanni et al., "Exhaust Air Injection," Filed May 25, 2012, U.S. Appl. No. 13/481,225, 40 pages.

*Primary Examiner* — Thomas Denion
*Assistant Examiner* — Mickey France
(74) *Attorney, Agent, or Firm* — Julia Voutyras; Alleman Hall McCoy Russell & Tuttle LLp

(57) ABSTRACT

Embodiments for controlling exhaust air-fuel ratio are provided. In one example, an engine method comprises adjusting upstream exhaust air-fuel ratio to maintain a first emission control device at or below a threshold temperature, and when the upstream exhaust air-fuel ratio is below a threshold, injecting air into an exhaust passage between the first emission control device and a second emission control device to maintain downstream exhaust at a different, higher air-fuel ratio. In this way, excess emissions may be converted while maintaining the emission control devices below a maximum temperature.

7 Claims, 9 Drawing Sheets

(51) Int. Cl.
  *F01N 3/30* (2006.01)
  *F02D 41/14* (2006.01)
  *F01N 3/08* (2006.01)
  *F02B 37/00* (2006.01)
  *F02D 41/00* (2006.01)
  *F01N 3/20* (2006.01)
  *F01N 13/00* (2010.01)

(56) References Cited

U.S. PATENT DOCUMENTS

| | | |
|---|---|---|
| 5,551,231 A | 9/1996 | Tanaka et al. |
| 5,746,049 A * | 5/1998 | Cullen .................. F01N 3/0842 60/274 |
| 6,354,079 B1 | 3/2002 | Choi et al. |
| 6,378,298 B2 | 4/2002 | Harima et al. |
| 6,393,834 B1 | 5/2002 | Takaoka et al. |
| 6,655,128 B1 | 12/2003 | Hei Ma |
| 6,848,251 B2 | 2/2005 | Ripper et al. |
| 7,673,447 B2 | 3/2010 | Gaiser |
| 2002/0004024 A1* | 1/2002 | Hertzberg .............. F01N 3/0814 423/224 |
| 2002/0092297 A1* | 7/2002 | Hertzberg .......... B01D 53/9481 60/295 |
| 2007/0028601 A1 | 2/2007 | Duvinage et al. |
| 2007/0193254 A1* | 8/2007 | Johannes .............. F01N 3/0871 60/286 |
| 2008/0306631 A1* | 12/2008 | Huang ............... B01D 53/9431 700/271 |
| 2009/0049825 A1* | 2/2009 | Ohashi ............................. 60/285 |
| 2009/0188240 A1* | 7/2009 | Suzuki et al. ................... 60/286 |
| 2009/0260349 A1 | 10/2009 | Gandhi et al. |
| 2011/0072794 A1* | 3/2011 | Van Nieuwstadt ...... F01N 3/101 60/285 |
| 2011/0072799 A1* | 3/2011 | Bidner .................... F01N 3/023 60/286 |
| 2011/0094482 A1* | 4/2011 | Weber ................. F02M 25/071 123/568.12 |

* cited by examiner

EXHAUST AIR INJECTION

FIELD

The present disclosure relates to an exhaust system of an engine.

BACKGROUND AND SUMMARY

Turbo charging an engine allows the engine to provide power similar to that of a larger displacement engine while engine pumping work is maintained near the pumping work of a normally aspirated engine of similar displacement. Thus, turbo charging can extend the operating region of an engine. However, in severely downsized engines, the close coupling of the turbocharger and downstream exhaust components, such as catalysts, can present difficulties during high load engine operation. For example, the high exhaust temperatures of high load operation can damage the turbocharger and/or catalyst. To avoid degradation to the exhaust components, the engine may be operated with rich combustion in high load conditions to lower exhaust temperatures.

However, the inventors herein have identified potential issues with the above approach. For example, the rich operation may produce a significant amount of CO and HC emissions. Further, the lowered exhaust temperatures may result in these emissions going unconverted in the downstream catalysts.

Thus, in one example, some of the above issues may be at least partly addressed by an engine method comprising adjusting upstream exhaust air-fuel ratio to maintain a first emission control device at or below a maximum temperature, and when the upstream exhaust air-fuel ratio is below a threshold, injecting air into an exhaust passage between the first emission control device and a second emission control device to maintain downstream exhaust at a different, higher air-fuel ratio.

In this way, the temperature and air-fuel ratio of the downstream emission control device, which is further from the exhaust manifold and thus subject to lower exhaust temperatures than the upstream emission control device, may be adjusted independently of the upstream emission control device. By doing so, emissions that escape from the upstream emission control device unconverted may be converted in the downstream emission control device, without subjecting the upstream emission control device to high temperatures which may contribute to component degradation.

In one example, the temperature and air-fuel ratio of the downstream emission control device may be adjusted via the introduction of secondary air into an exhaust passage between the upstream emission control device and the downstream emission control device. The secondary air may include compressed intake air routed from the intake passage to the exhaust passage. Further, in some embodiments, the compressed intake air may be routed to the exhaust passage via an LP-EGR passage coupled the exhaust passage. The secondary air may be introduced based on feedback control to maintain a downstream air-fuel ratio at stoichiometry and/or maintain a temperature of the downstream emission control device within a threshold range.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An air injection system may be provided in an exhaust system to adjust air-fuel ratio downstream of a first emission control device, such as a three-way catalyst. The three-way catalyst may be prone to degradation due to high exhaust temperatures. To lower exhaust temperatures, the engine may be operated rich and air may be injected into the exhaust downstream of the three-way catalyst in order to provide additional oxygen to a downstream emission control device, such as a lean NOx trap. In other circumstances, such as when conditions disrupt effective NOx conversion in the three-way catalyst, air may be injected to ensure lean air-fuel ratio at the lean NOx trap so that NOx may be stored in the lean NOx trap.

Figure 1:
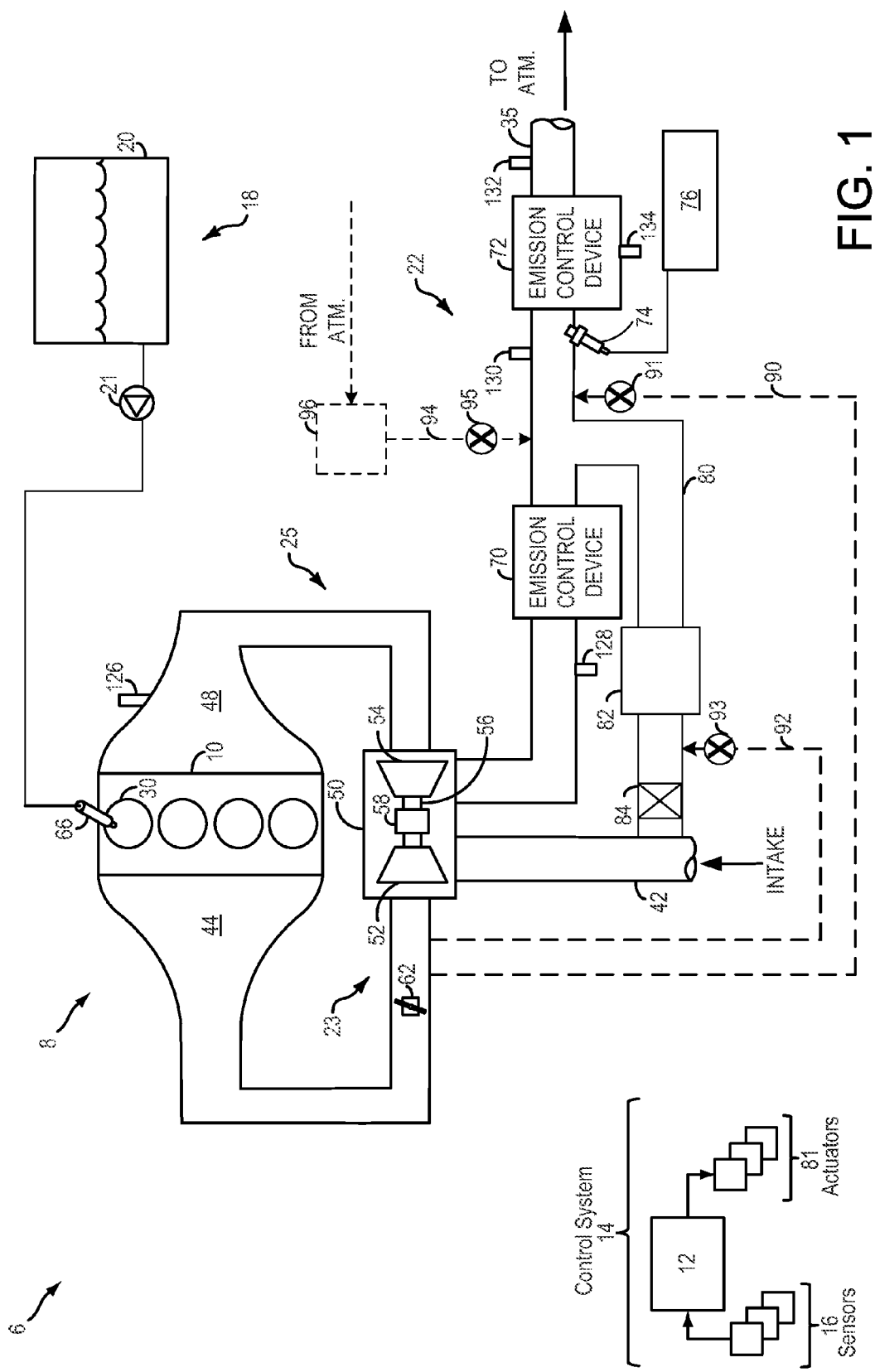
FIG. 1 shows a schematic depiction of a vehicle system including an engine and an associated exhaust after-treatment system.

The air may be compressed intake air that is routed to the exhaust passage directly, or via an EGR passage. The compressed intake air, when routed via the EGR passage, may be routed to the EGR passage upstream of an EGR cooler to provide additional EGR cooler regeneration assistance. Thus, the injected air may improve emissions by providing lean exhaust to a downstream emission control device while increasing EGR cooler performance. FIG. 1 depicts an engine including an air injection system, upstream and downstream emission control devices, and a controller configured to execute the methods of FIGS. 2-7.

FIG. 1 shows a schematic depiction of a vehicle system 6. The vehicle system 6 includes an engine system 8 coupled to an exhaust after-treatment system 22. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger. Turbocharger 50 may include a compressor 52, arranged between intake passage 42 and intake manifold 44. Compressor 52 may be at least partially powered by exhaust turbine 54, arranged between exhaust manifold 48 and exhaust passage 35. Compressor 52 may be coupled to exhaust turbine 54 via shaft 56. Compressor 52 may also be at least partially powered by an electric motor 58. In the depicted example, electric motor 58 is shown coupled to shaft 56. However, other suitable configurations of the electric motor may also be possible. In one example, the electric motor 58 may be operated with stored electrical energy from a system battery (not shown) when the battery state of charge is above a charge threshold. By using electric motor 58 to operate turbocharger 50, for example at engine start, an electric boost (e-boost) may be provided to the intake air charge. In this way, the electric motor may provide a motor-assist to operate the boosting device. As such, once the engine has run for a sufficient amount of time (for example, a threshold time), the exhaust gas generated in the exhaust manifold may start to drive exhaust turbine 54. Consequently, the motor-assist of the electric motor may be decreased. That is, during turbocharger operation, the motor-assist provided by the electric motor 58 may be adjusted responsive to the operation of the exhaust turbine.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel system.

While not shown in FIG. 1, each cylinder 30 may include one or more intake valves and one or more exhaust valves to control intake of charge air and release of exhaust gas, respectively. The timing of the opening and closing of the intake and exhaust valves may be fixed, or the intake and exhaust valve opening and/or closing timings may vary, such as to provide positive or negative valve overlap, late intake valve closing, or various other examples.

Engine exhaust 25 may be coupled to exhaust after-treatment system 22 along exhaust passage 35. Exhaust after-treatment system 22 may include one or more emission control devices, such as emission control devices 70, 72, which may be mounted in a close-coupled position in the exhaust passage 35. The emission control devices may include a three-way catalyst, lean NOx conversion device, or particulate filter, SCR catalyst, and/or combinations thereof. In one example embodiment, emission control device 70 may be a three-way catalyst and emission control device 72, positioned downstream of emission control device 70, may be a LNT. In another example, emission control device 72 may be an SCR system, or another underbody catalyst. For example, emission control device 72 may be an SCR catalyst configured to reduce exhaust NOx species to nitrogen upon reaction with reductant, such as ammonia or urea. Reductant injector 74 may inject reductant 76 into exhaust passage 35.

The catalysts may enable toxic combustion by-products generated in the exhaust, such as NOx species, unburned hydrocarbons, carbon monoxide, etc., to be catalytically converted to less-toxic products before expulsion to the atmosphere. However, the catalytic efficiency of the catalyst may be largely affected by the temperature and oxygen content of the exhaust gas. For example, the reduction of NOx species may utilize higher temperatures than the oxidation of carbon monoxide. Unwanted side reactions may also occur at lower temperatures, such as the production of ammonia and $N_2O$ species, which may adversely affect the efficiency of exhaust treatment, and degrade the quality of exhaust emissions. To improve the efficiency of exhaust after-treatment while protecting exhaust system components from high exhaust temperatures, it may be desirable to increase the oxygen content of the exhaust downstream of the first emission control device (e.g., emission control device 70).

As further elaborated herein with reference to FIGS. 2-7, an engine controller may be configured to inject secondary air flow into the exhaust after-treatment system downstream of emission control device 70 to increase conversion of certain emissions during various operating conditions. As depicted in FIG. 1, the secondary air may derive from one or more of multiple sources. For example, the secondary air may include compressed intake air that is directed to the exhaust passage from the intake passage between the compressor 52 and the throttle 62. Injection line 90 directs compressed intake air directly to the exhaust passage 35, downstream of emission control device 70 and upstream of emission control device 72. The compressed intake air injected into the exhaust via the injection line 90 may be controlled via valve 91, which may be controlled by the engine controller.

Alternatively or additionally, air may be injected to the exhaust passage via an exhaust gas recirculation (EGR) passage. Air injection line 92 directs compressed air upstream of the throttle to the exhaust passage 35 via EGR passage 80. EGR passage 80 is configured to redirect a portion of exhaust back to the intake, in order to lower combustion temperatures and hence NOx emissions. EGR passage 80 includes an EGR cooler 82, which is configured to cool the EGR prior to reaching the intake. Further, EGR passage 80 includes an EGR valve 84, which may be adjusted by controller 12 in order to control the flow of EGR to the intake. As shown in FIG. 1, EGR passage 80 is a low-pressure EGR (LP-EGR) passage, as the EGR that is directed through EGR passage 80 is low-pressure EGR taken downstream of the turbine 54. Air injection line 92 is coupled to EGR passage 80 between the EGR valve 84 and EGR cooler 82, and is controlled via valve 93. When the injection of compressed intake air to the exhaust passage is indicated, valve 93 is opened, and EGR valve 84 is closed. The compressed intake air then is directed through the air injection line 92 to the EGR passage 80, where it passes through EGR cooler 82 before reaching the exhaust passage 35, downstream of emission control device 70.

Further, in some embodiments, an air pump 96 may be present to inject outside air (e.g., from the atmosphere) into the exhaust passage 35 via injection line 94, which is controlled by valve 95.

Exhaust after-treatment system 22 may also include hydrocarbon retaining devices, particulate matter retaining devices, and other suitable exhaust after-treatment devices (not shown). It will be appreciated that other components may be included in the engine such as a variety of valves and sensors.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), upstream oxygen sensors 128, 130 (oxygen sensor 128 may be located upstream of emission control device 70 while oxygen sensor 130 may be located upstream of emission control device 72 and downstream of emission control device 70), downstream oxygen sensor 132 (located downstream of emission control device 72), and temperature sensor 134. Other sensors such as pressure, temperature, air/fuel ratio, and composition sensors may be coupled to various locations in the vehicle system 6, as discussed in more detail herein. As another example, the actuators may include fuel injectors (such as fuel injector 66), a variety of valves, such as valves 91, 93, 95, pump 96, and throttle 62. The control system 14 may include a controller 12. The controller may receive input data from the various sensors, process the input data, and trigger the actuators in response to the processed input data, based on instruction or code programmed therein, corresponding to one or more routines. Example control routine is described herein with reference to FIGS. 2-7.

Figure 2:
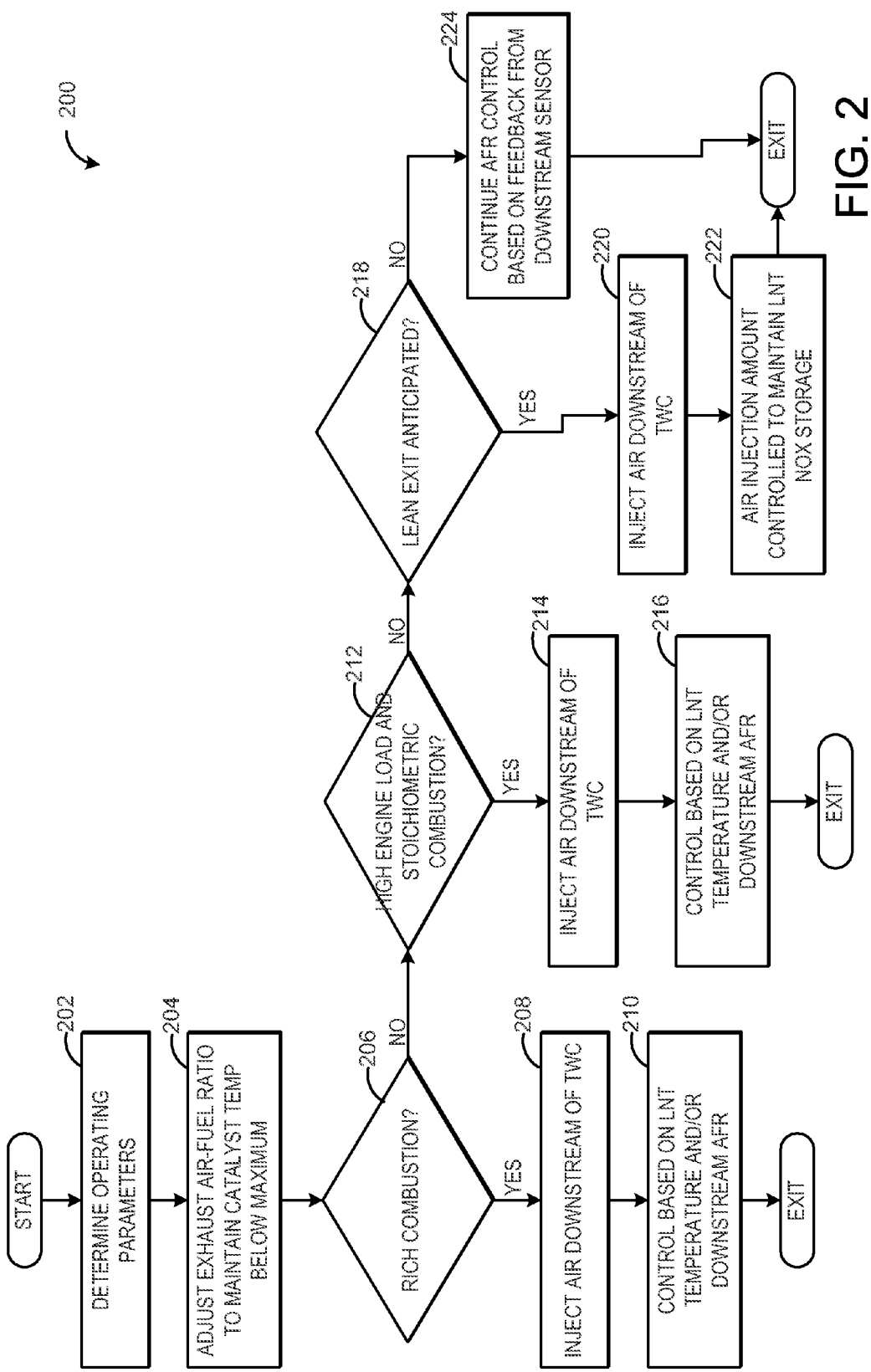
FIG. 2 shows a flow chart illustrating a method for controlling exhaust air-fuel ratio according to an embodiment of the present disclosure.

FIG. 2 is a flow chart illustrating a method 200 for controlling exhaust air-fuel ratio. Method 200 may be carried out by an engine controller, such as controller 12, in response to signals from one or more sensors and according to instructions stored in the memory of the controller. Method 200 may be carried out in an engine including an exhaust system with at least two emission control devices, an upstream emission control device and a downstream emission control device. As used herein "upstream" and "downstream" are relative to the direction of exhaust flow from the engine and to the atmosphere, e.g., the upstream emission control device is closer to the engine and receives engine-out exhaust prior to the exhaust reaching the downstream emission control device. In the embodiment described with respect to FIG. 2, the upstream emission control device is a three-way catalyst (TWC) and the downstream emission control device is a lean NOx trap (LNT); however, other emission control devices in other arrangements are within the scope of this disclosure.

Method 200 comprises, at 202, determining engine operating parameters. The engine operating parameters may include engine speed, engine load, fuel injection amount and timing, exhaust air-fuel ratio, throttle position, EGR valve position, exhaust temperature, etc. Further, determining exhaust air-fuel ratio may include the air-fuel ratio of exhaust in multiple locations, such as engine-out air-fuel ratio, air-fuel ratio at the inlets of one or more emission control devices, and air-fuel ratio at the outlet of one or more emission control devices.

At 204, exhaust air-fuel ratio is adjusted to maintain the TWC (e.g., emission control device 70 of FIG. 1), at or below a threshold temperature. For example, the engine may be operated with a desired air-fuel ratio set for maximum fuel economy, torque, and/or emissions benefits. However, during some conditions, such as high load conditions, the desired air-fuel ratio may result in exhaust temperatures at the inlet of the TWC exceeding a threshold temperature. The threshold temperature may be a maximum temperature above which exhaust component degradation may occur, such as 950° C. In other embodiments, the threshold temperature may be below the maximum temperature, in order to avoid the TWC from reaching the maximum temperature. If the temperature of the exhaust at the inlet of the TWC exceeds the threshold, or if the actual temperature of the device exceeds the threshold, the air-fuel ratio of combustion may be adjusted (and hence the air-fuel ratio of the exhaust upstream of the TWC) to maintain the exhaust temperature at a desired temperature. For example, the engine may be operated with rich combustion to lower exhaust temperatures.

At 206, it is determined if the engine is operating with engine-out exhaust air-fuel ratio below a threshold. The threshold may be an exhaust air-fuel ratio below which excess HC and CO are produced, such as stoichiometry. If the engine is operating with exhaust air-fuel ratio below stoichiometry, otherwise known as rich combustion, excess HC and/or CO may be released into the exhaust, which may go unconverted in the TWC and LNT at the current air-fuel ratio. As such, if the answer at 206 is yes, method 200 proceeds to 208 to inject air downstream of the TWC in order to provide additional oxygen in the exhaust upstream of the LNT. In doing so, the air-fuel ratio of downstream exhaust (e.g., exhaust downstream of the TWC) is maintained at a higher (e.g., leaner) air-fuel ratio than the exhaust entering the TWC.

The extra oxygen from the injected air is available for reaction with the HC in the exhaust, and the excess HC and CO may be oxidized in the LNT. The reaction with oxygen in the exhaust may raise the temperature of the exhaust at the LNT. However, due to the extra distance the exhaust travels to reach the LNT (relative to the distance the exhaust travels to reach the TWC), the exhaust cools before the reaching the LNT such that the exotherms released as a result of the additional oxygen injected into the exhaust do not raise the temperature of the LNT above the maximum temperature. However, the amount of air injected downstream of the TWC may be controlled at 210 based on LNT temperature, to avoid raising the temperature of the LNT above the maximum temperature. Alternatively or additionally, the amount of air injected may be controlled based on the air-fuel ratio downstream of the LNT. For example, the air-fuel ratio downstream of the LNT may be maintained at stoichiometry. Upon controlling the air injection downstream of the TWC, method 200 exits.

Figure 8:
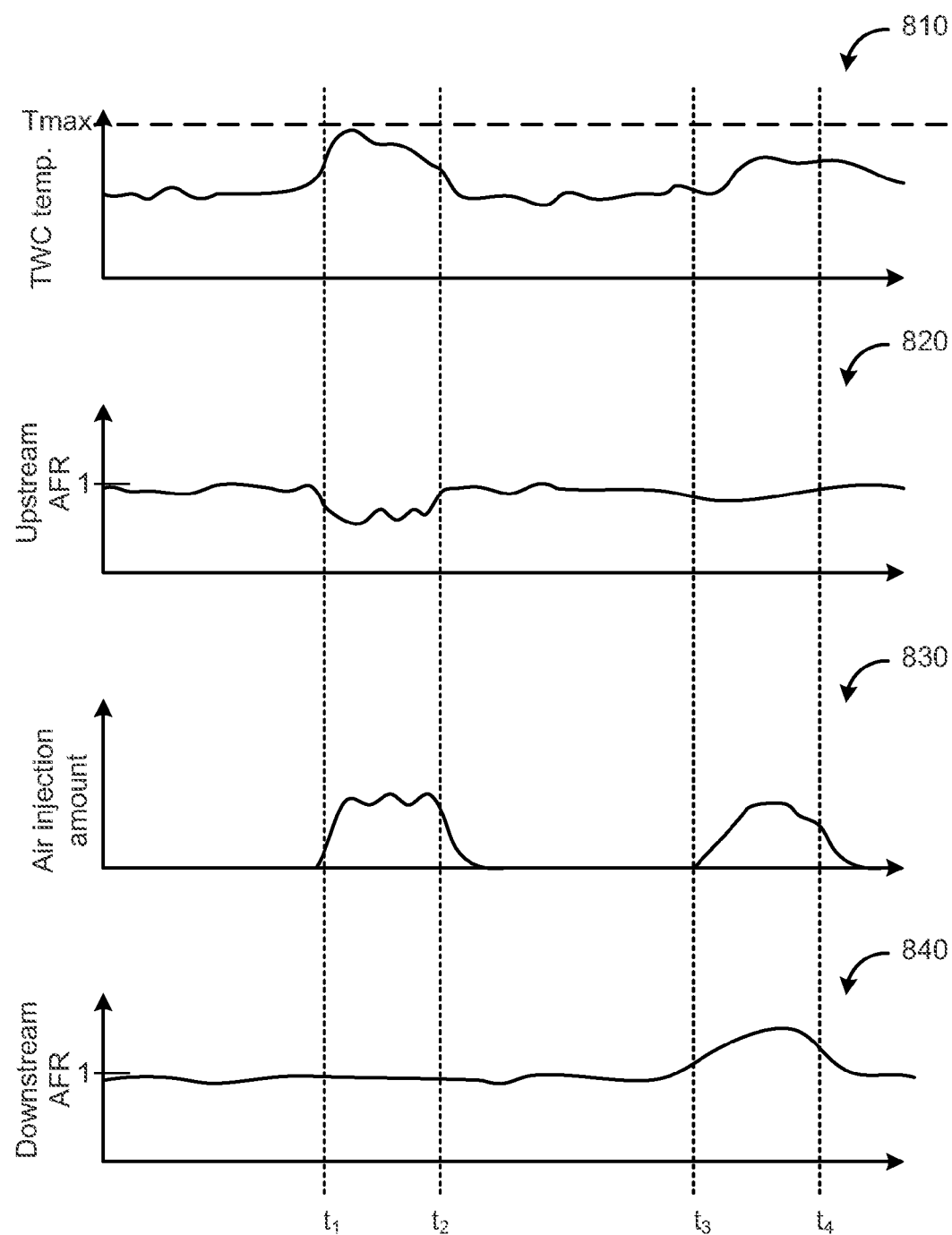
FIGS. 8 and 9 show example diagrams of engine operating parameters during air injection according to embodiments of the present disclosure.

Example diagrams depicting engine operating parameters during a rich excursion with air injection upstream of an LNT and downstream of a TWC are depicted in FIG. 8. TWC temperature is depicted at 810, upstream air-fuel ratio (e.g., upstream of the TWC and/or LNT) is depicted at 820, an air injection amount is depicted at 830, and downstream air-fuel ratio (downstream of the LNT) is depicted at 840. For each diagram, time is plotted on the x axis, and each respective parameter is plotted the y axis. For diagrams 820 and 840, depicting air-fuel ratio, stoichiometric air-fuel ratio is indicated by the marker 1. At time $t_1$, TWC catalyst temperature reaches the threshold temperature, which in this embodiment is less than the maximum temperature tolerated by the TWC. To prevent the TWC from reaching the maximum temperature, the engine is operated rich, shown by the decreasing upstream air-fuel ratio. In response, air injection is activated. As the air injection amount is controlled via feedback from a downstream oxygen sensor, the downstream air-fuel ratio remains substantially stoichiometric. At time $t_2$, the rich excursion ends, air injection is deactivated, and both downstream and upstream air-fuel ratios are at stoichiometry.

Returning to 206 of FIG. 2, if the engine is not operating with rich combustion, method 200 proceeds to 212 to determine if the engine is operating under high load conditions with stoichiometric combustion. Under these conditions, the relatively high exhaust space velocity may disrupt NOx conversion in the TWC. In order to ensure storage of the excess NOx in the LNT, method 200 proceeds to 214 to inject air downstream of the TWC, if the engine is operating with high load and stoichiometric combustion. At 216, the air injection amount may be controlled based on LNT temperature and/or downstream air-fuel ratio. For example, air may be injected such that a temperature of the LNT is maintained below a storage threshold, such as 450° C. and/or such that downstream air-fuel ratio is maintained lean of stoichiometry. Upon controlling the air injection downstream of the TWC, method 200 exits.

FIG. 8 also shows air injection during high load, stoichiometric combustion conditions. At time $t_3$, engine load increases due to, for example, a driver tip-in event. However, unlike at time $t_1$, the TWC catalyst temperature (shown in 810) remains below the threshold for initiating rich combustion. But due to the high load, stoichiometric combustion conditions (e.g., upstream air-fuel ratio, shown in 820, remains around stoichiometry), air injection is activated at time $t_3$ (shown in 830) to create a lean environment in the LNT for storage of NOx that may slip past the TWC. As a result of the air injection, downstream air-fuel ratio (depicted in 840) increases, until time $t_4$, when load drops and the air injection is deactivated.

Returning to FIG. 2, if at 212 it is determined that the engine is not operating at high load with stoichiometric combustion, method 200 proceeds to 218 to determine if a lean exit is anticipated. A lean exit may be a transition from lean combustion to stoichiometric or rich combustion, and may be determined based on the air-fuel ratio commanded by the controller, by engine operating parameters such speed, load, etc., and/or by exhaust air-fuel ratio. If a lean exit is anticipated, air may be injected downstream of the TWC at 220. Following a lean exit, the NOx stored in the LNT may be released due to the lack of oxygen in the exhaust. To prevent this, the air is injected upstream of the LNT so that the exhaust will be lean, and the NOx trapped in the LNT will remain in the LNT until a purge is indicated. The air injection may be controlled at 222 to maintain a lean air-fuel ratio at the LNT to maintain NOx storage. Upon controlling the air injection, method 200 exits.

If, at 218, it is determined that a lean exit is not anticipated, method 200 proceeds to 224 to continue air-fuel ratio feedback control based on sensor input from one or more exhaust gas sensors, in order to maintain desired combustion air-fuel ratio and TWC temperature, without injecting air downstream of the TWC. Because no air is being injected downstream of the TWC, air-fuel ratio feedback control may include feedback from one or more exhaust gas sensors downstream of the TWC. In contrast, during operation wherein air is injected downstream of the TWC, the exhaust oxygen concentration as determined by the downstream exhaust gas sensors may be omitted from the feedback control, or may be adjusted to account for the additional oxygen present in the exhaust. Method 200 then exits.

Thus, method 200 of FIG. 2 provides for increasing exhaust air-fuel ratio downstream of a TWC and upstream of a LNT in order to maintain emission control while keeping the temperature of the TWC below a maximum temperature. Maintaining the TWC below a maximum temperature may include commanding the engine to operate rich in order to cool the exhaust. In some embodiments, if the engine is operating with positive valve overlap, in which the exhaust valve is open for a duration while the intake valve is opening, the valve timing may be adjusted to avoid valve overlap during rich operation. Positive valve overlap may result in sufficient levels of oxygen in the exhaust manifold to create reactions with the rich exhaust, heating the exhaust, and thus may be interrupted during rich operation.

Figure 3:
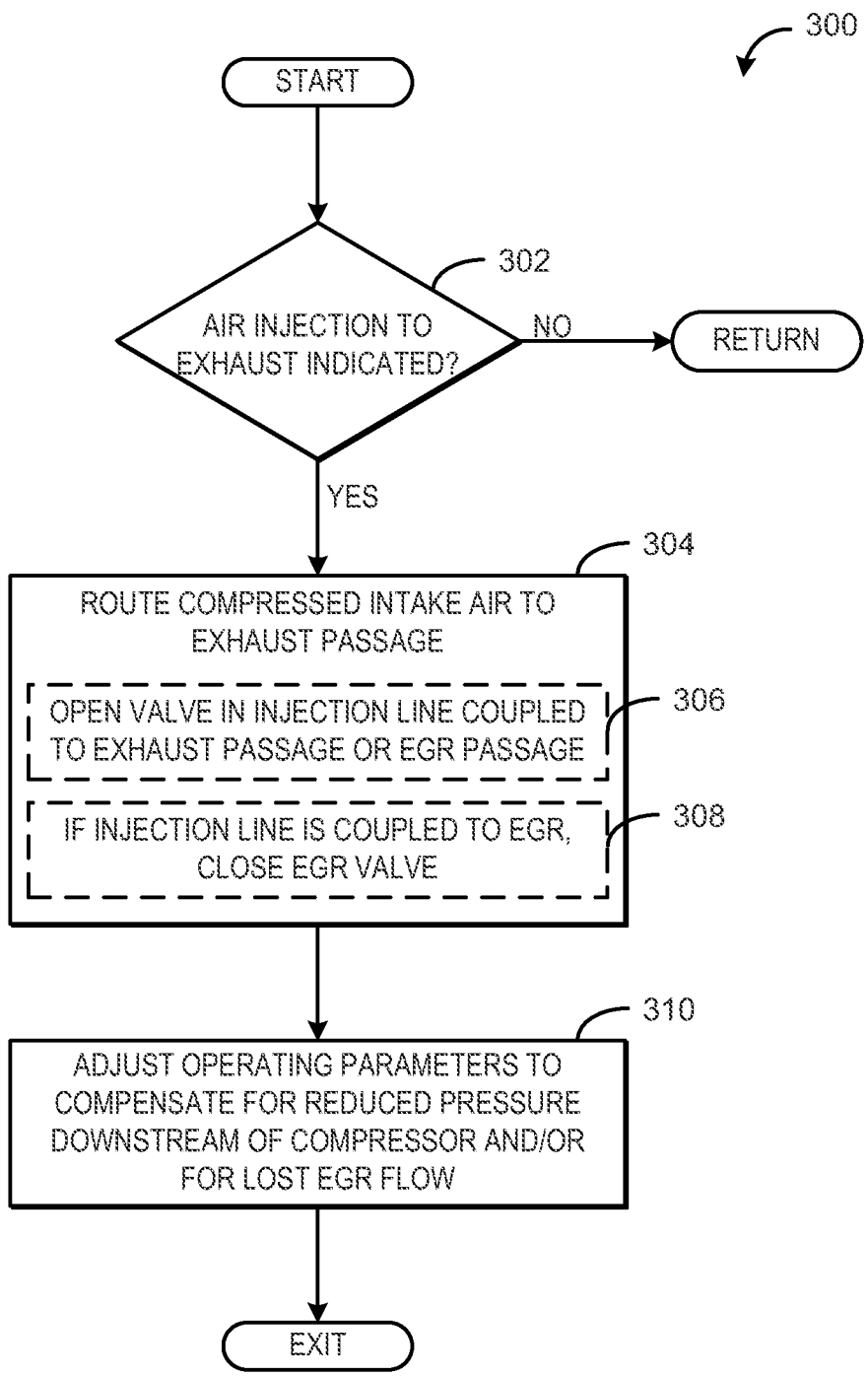
FIG. 3 shows a flow chart illustrating a method for injecting air in an exhaust passage according to an embodiment of the present disclosure.

FIG. 3 is a flow chart illustrating a method 300 for injecting air downstream of a upstream emission control device, such as the emission control device 70 of FIG. 1. Method 300 may be carried out by the controller 12 if air injection is indicated during the execution of method 200 discussed with respect to FIG. 2.

Method 300 comprises, at 302, determining if air injection is indicated. Air injection may be indicated in order to provide a leaner air-fuel ratio downstream of the upstream emission control device than is provided from the engine. Air injection may be indicated based on the conditions discussed with respect to FIG. 2, for example, at 208, 214, or 220, or based on another suitable parameter. For example, as described with respect to FIG. 1 and elaborated herein, air may be provided to the exhaust passage via an EGR passage including an EGR cooler. If the cooler effectivity is low, air injection may be indicated to flake off soot or other debris that may have accumulated on the cooler.

If injection is not indicated, method 300 returns to keep monitoring for air injection indication. If air injection is indicated, method 300 proceeds to 304 to route compressed intake air to the exhaust passage downstream of the upstream emission control device. Routing the compressed intake air may include opening a valve in an injection line coupled to the exhaust passage or opening a valve in an injection line coupled to an EGR passage at 306. As explained with respect to FIG. 1, the air injected to the exhaust passage may be taken from the intake passage, downstream of the compressor and upstream of the throttle. The intake air downstream of the compressor will be compressed, e.g., at a pressure greater than atmospheric. The opening of the valve in the injection line allows the air to enter the exhaust passage without provision of a pump or other device to pressurize the air. The air from the injection line may be routed directly to the exhaust passage or may be routed via an LP-EGR passage. However, in some embodiments, the air may be injected to the exhaust passage using an air pump. Such pumped air may not derive from the intake but instead may be atmospheric air, for example.

Routing compressed intake air to the exhaust passage may also include, at 308, closing an EGR valve (if the injection line is coupled to an EGR passage). By closing the EGR valve, EGR flow from the exhaust to the intake will be prevented, and the compressed air may instead travel through the EGR passage to the exhaust passage.

At 310, one or more operating parameters may be adjusted to compensate for the reduced intake air pressure downstream of the compressor and/or to compensate for lost EGR flow. For example, the diversion of compressed intake air may reduce the pressure of the intake air upstream of the throttle; as a result, the throttle position may be adjusted to provide desired mass air flow to the engine. Further, the turbocharger may be controlled to increase the boost pressure provided to the intake. A turbine wastegate may be adjusted to increase boost pressure, or a compressor bypass valve may be adjusted.

If the compressed intake air is routed through an EGR passage prior to reaching the exhaust passage, if EGR flow is desired in order to lower combustion temperature or reduce engine pumping losses, one or more parameters may be adjusted to compensate for the loss of EGR flow. For example, if the engine includes an HP-EGR system, flow through the HP-EGR system may be increased. In another example, fuel injection timing may be adjusted to decrease combustion temperature, or the fuel injection may be split, which also acts to lower combustion temperature. Upon adjusting engine operating parameters, method 300 exits.

Methods 200 and 300 described above provide for injecting air into an exhaust passage in response to one or more conditions, such as rich combustion, in order to maintain the exhaust downstream of a TWC at a leaner air-fuel ratio than the exhaust upstream of the TWC. Method 200 controls injection or air based on feedback from an oxygen sensor and/or the temperature of a LNT downstream of the TWC. However, in engine systems where the LNT is replaced by a reduction catalyst, such as an SCR system, air may be injected upstream of the SCR system and downstream of the TWC to ensure efficient NOx conversion during engine operation with lower than desired exhaust oxygen concentrations.

Figure 4:
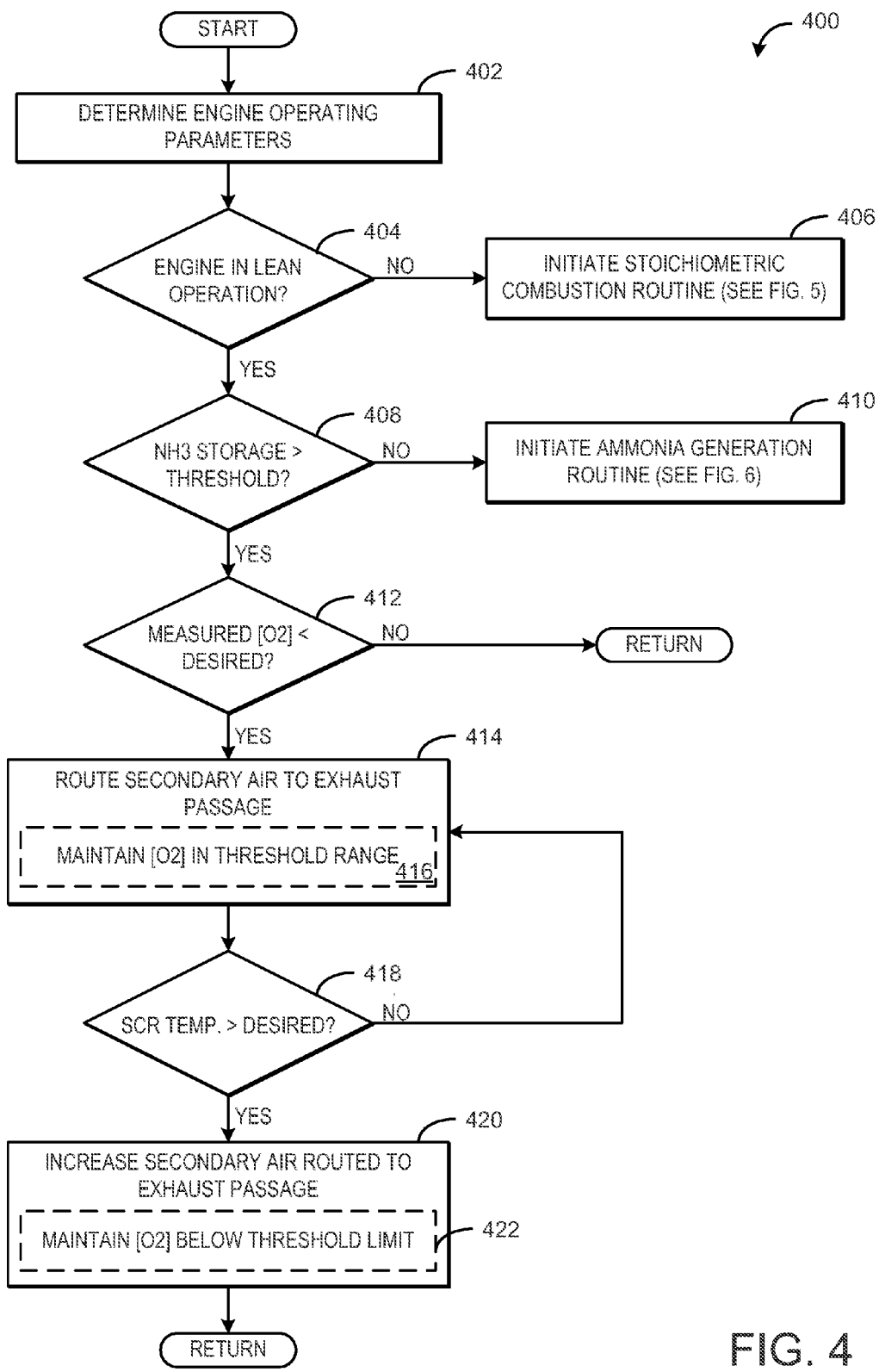
FIG. 4 shows a flow chart illustrating a method for controlling air introduction during lean combustion according to an embodiment of the present disclosure.

Turning to FIG. 4, a method 400 for controlling air injection upstream of a catalyst is illustrated. Method 400 may be carried out by controller 12. In some embodiments, method 400 may be carried out in a gasoline engine configured to operate with lean combustion. As explained previously, lean combustion, which may include air-fuel ratios around 20:1 or greater, produces higher amounts of NOx than stoichiometric combustion. To ensure conversion of the increased NOx species, lean burn gasoline engines may include a reduction catalyst, such as an SCR system, in the exhaust system. However, unlike diesel engines which may operate with substantially higher air-fuel ratios, lean burn gasoline engines may not produce exhaust with adequate oxygen concentration to ensure efficient NOx conversion. Thus, method 400 provides a mechanism for increasing the oxygen concentration upstream of a reduction catalyst in a lean burn gasoline engine.

At 402, engine operating parameters are determined. The engine operating parameters may include engine speed, load, air-fuel ratio, exhaust oxygen concentration, engine temperature, and SCR temperature. Additional operating parameters that may be determined include exhaust mass air flow, exhaust NOx levels, injected reductant levels upstream of the SCR catalyst, and other parameters. At 404, it is determined if the engine is operating in lean operation. Lean operation may include air-fuel ratios greater than stoichiometric, and may include air-fuel ratios between 20:1 and 28:1, or other air-fuel ratios. Lean operation may be determined based on measured exhaust air-fuel ratio, commanded fuel injection amounts, and/or operating parameters such as load. For example, the engine may be operated with lean combustion during low to mid engine loads (e.g., loads of 50% or less) and then operate with stoichiometric combustion at higher loads.

If the engine is not operating with lean combustion, it is likely operating with substantially stoichiometric combustion and method 400 proceeds to 406 to initiate a stoichiometric combustion routine, which will be explained in detail below with respect to FIG. 5. If it is determined that the engine is operating with lean combustion, method 400 proceeds to 408 to determine if an ammonia ($NH_3$) storage amount in the SCR catalyst is above a threshold. The SCR catalyst may store $NH_3$ in order to convert the NOx species that enter the SCR catalyst. The stored ammonia may be oxidized by oxygen in the exhaust; thus, in order to maintain a baseline level of stored ammonia sufficient for NOx conversion, the amount of stored ammonia must exceed a lower limit threshold to compensate for increased ammonia oxidation in response to the injected air. The amount of stored $NH_3$ may be determined by a storage estimate that is a function of upstream NOx concentration, $NH_3$ consumption (determined by comparing upstream NOx levels to downstream NOx levels, for example), SCR temperature, and $NH_3$ generation (determined by SCR temperature, oxygen concentration, and injected $NH_3$ levels, for example). The lower limit threshold for $NH_3$ storage may be a function of SCR temperature.

If it is determined that the $NH_3$ storage amount does not exceed the lower limit threshold, method 400 proceeds to 410 initiate an ammonia generation routine, which will be explained with respect to FIG. 6. If the $NH_3$ storage amount does exceed the threshold, method 400 proceeds to 412 to determine if measured exhaust oxygen concentration is less than desired. The exhaust oxygen concentration may be determined by a sensor upstream of the SCR catalyst, such as sensor 130 of FIG. 1. The desired oxygen concentration may be determined based on SCR temperature, exhaust space, and exhaust NOx mass. Thus, the desired oxygen concentration is the amount of oxygen in the exhaust that will result in near-complete conversion of NOx in the SCR catalyst. In one example, the desired oxygen concentration may range from 8-10%.

If the exhaust oxygen concentration is not less than the desired concentration, sufficient oxygen is present to convert NOx in the SCR, and method 400 returns to continue to monitor for conditions that indicate air should be injected. If the oxygen concentration is less than desired, method 400 proceeds to 414 to route secondary air to the exhaust passage upstream of the SCR catalyst. In one example, the air may be routed downstream of an upstream emission control device, which may be a two-way or three-way catalyst, for example. However, in other examples, the air may be routed upstream of the two-way or three-way catalyst. As explained with respect to FIGS. 1 and 3, the secondary air may be intake air routed from downstream of a turbocharger compressor directly to the exhaust passage, or may be compressed intake air routed via an EGR passage. In other embodiments, the secondary air may be injected via an air pump. Routing the secondary air to the exhaust passage includes maintaining exhaust oxygen concentration in a threshold range at 414. The secondary air may be introduced to the exhaust in an amount that maintains the exhaust below an upper limit threshold (e.g., 10%) above which ammonia oxidation may reach undesirable levels, yet at or above the desired oxygen amount. Maintaining the oxygen within the threshold range may be achieved by feedback control from the oxygen sensor in the exhaust passage.

At 418, it is determined if the SCR temperature is greater than desired. The SCR may achieve optimal NOx conversion within a temperature window, e.g., 200-450° C. If the temperature of the SCR is outside this window, the amount of secondary air routed to the exhaust may be increased or decreased. For example, if the SCR temperature is greater than desired, method 400 may proceed to 420 to increase the secondary air to the exhaust in order to cool the SCR catalyst. However, to ensure ammonia oxidation does not occur, the amount of secondary air routed to the exhaust is limited at 422 to maintain the exhaust oxygen concentration below a threshold limit. If the SCR temperature is not greater than desired, if possible the amount of air introduced may be decreased, or method 400 may return to 414 to continue to introduce air based on feedback from the oxygen sensor. Upon introducing the secondary air and adjusting the amount of air based on feedback from an oxygen sensor and SCR temperature sensor, method 400 returns.

Thus, method 400 provides for injecting secondary air to an exhaust passage upstream of an SCR device. The air may be introduced when exhaust oxygen is at a lower concentration than desired for optimal NOx conversion in the SCR catalyst, such as during operation with engine air-fuel ratios of greater than 20:1, yet lower than typical diesel air-fuel ratios. By providing an SCR system in the exhaust, introducing secondary air when indicated, and operating at air-fuel ratios around 20:1 or 25:1, efficient conversion of NOx may occur in the SCR system, alleviating the need for a three-way catalyst upstream of the SCR system. Thus, in some embodiments, the three-way catalyst may be replaced with a two-catalyst.

Figure 9:
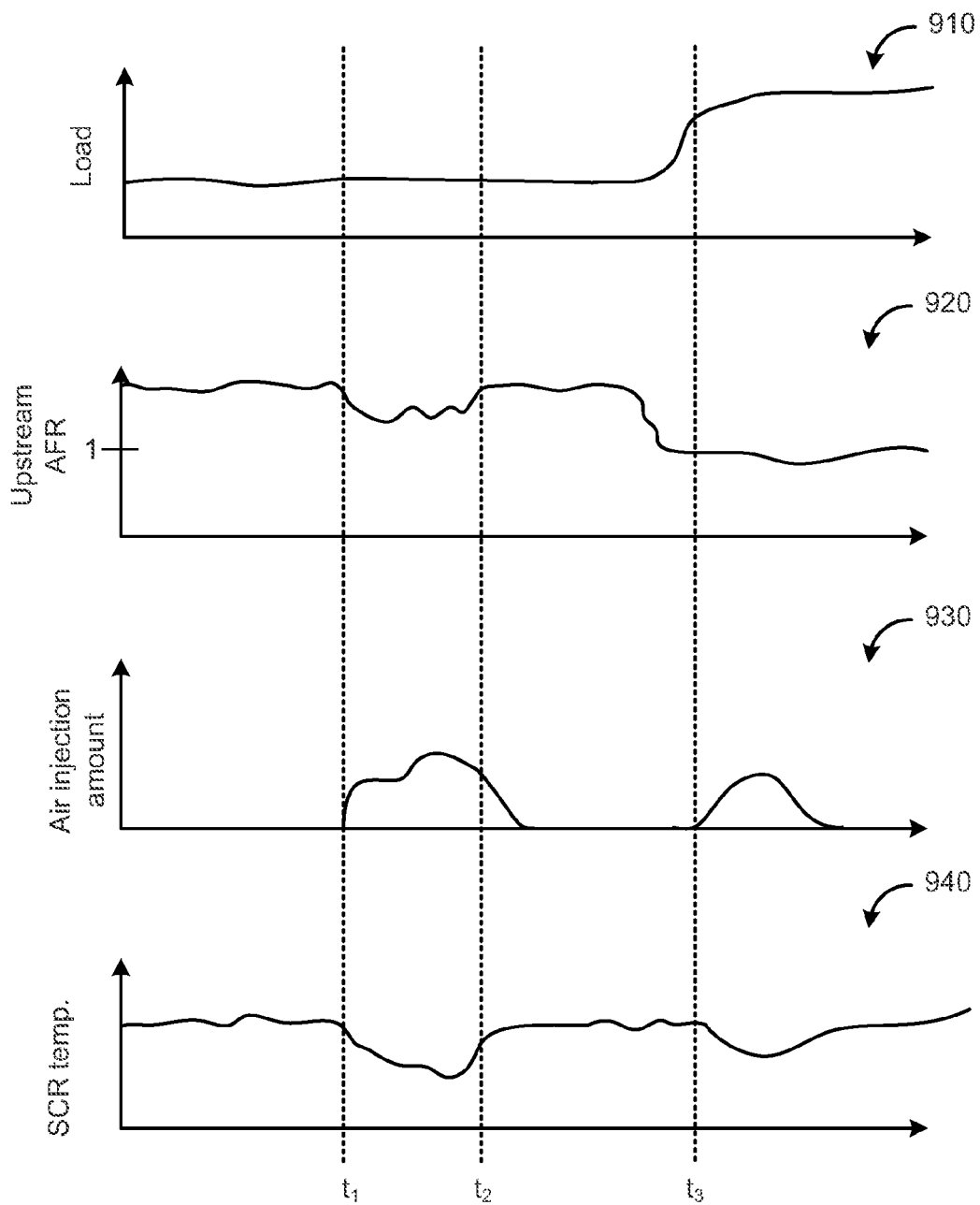

Example diagrams depicting engine operating parameters during lean combustion with air injection upstream of an SCR and downstream of a TWC are depicted in FIG. 9. Engine load is depicted at 910, upstream air-fuel ratio (e.g., engine out air-fuel ratio) is depicted at 920, an air injection amount is depicted at 930, and SCR temperature is depicted at 940. For each diagram, time is plotted on the x axis, and each respective parameter is plotted the y axis. For diagram 920, stoichiometric air-fuel ratio is indicated by the marker 1. Prior to time $t_1$, the engine is operating with lean combustion, as load is relatively low. At time $t_1$, upstream air-fuel ratio drops, and as a result, less oxygen is available in the exhaust to convert NOx in the SCR. Thus, air injection is activated to introduce secondary air to the exhaust passage upstream of the SCR catalyst. The air injection starts to cool the SCR, and the air injection amount may be increased in order to cool the SCR catalyst to a desired temperature. At time $t_2$, air-fuel ratio increases, and thus the air injection is deactivated.

Method 400 provides for introducing secondary air during lean combustion. However, during certain operating events with stoichiometric combustion, such as acceleration events, high exhaust gas flows may allow some NOx to slip past the TWC. To provide optimal conversion of NOx during these events, method 500 of FIG. 5 may be carried out, as explained below. Both methods 400 and 500 rely on sufficient $NH_3$ storage levels in the SCR catalyst to be present in order to avoid oxidizing all available $NH_3$, resulting in NOx slip out of the SCR catalyst. If it is determined that the $NH_3$ storage levels are too low, method 600 of FIG. 6 may be carried out to generate $NH_3$ while providing for gas phase NOx conversion. Additionally, if it is determined that the temperature of the SCR catalyst is too high to store $NH_3$, method 700 of FIG. 7 may be carried out to cool the SCR catalyst using the introduction of secondary air.

Figure 5:
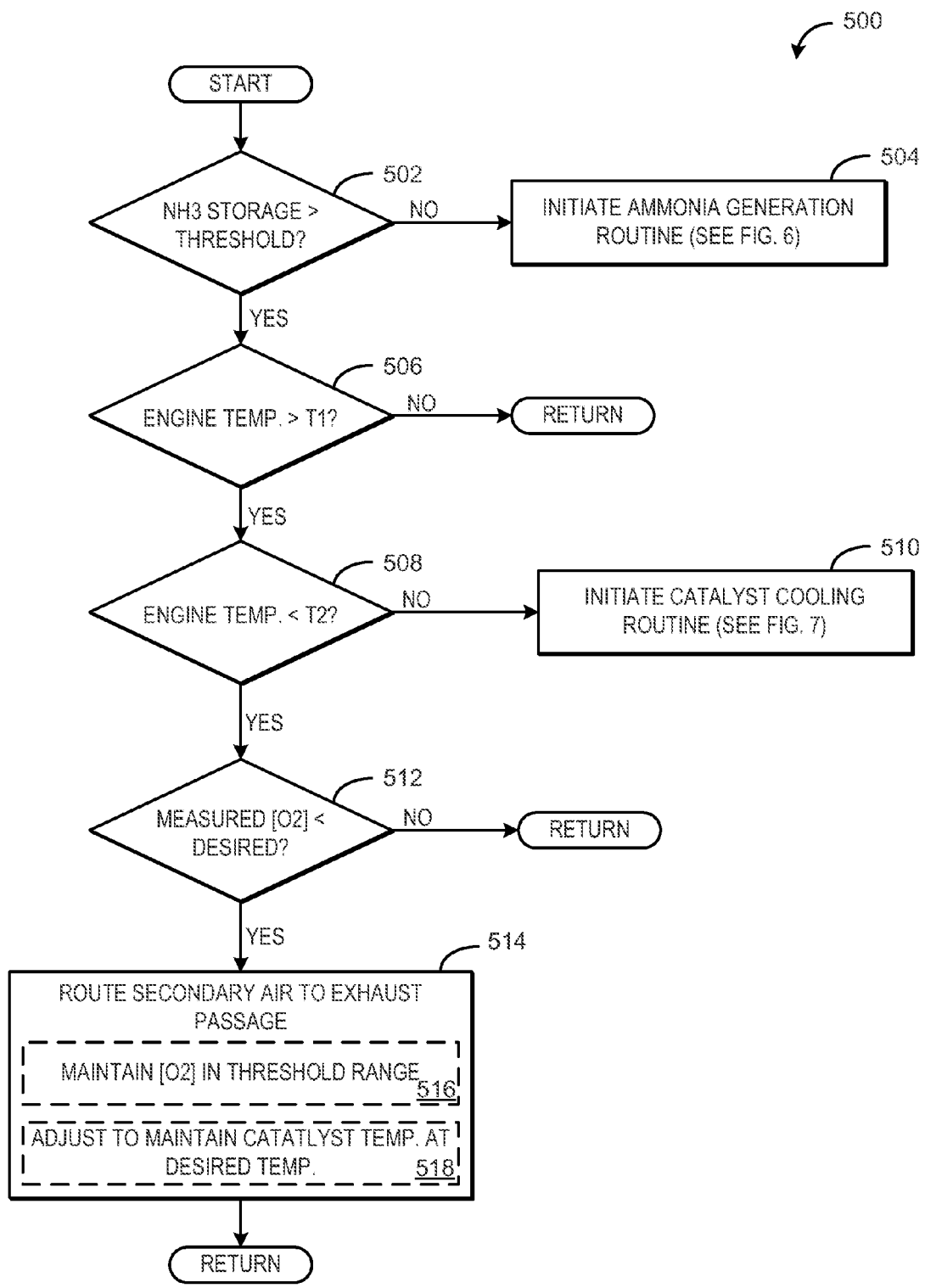
FIG. 5 shows a flow chart illustrating a method for controlling air introduction during stoichiometric combustion according to an embodiment of the present disclosure.

Turning now to FIG. 5, a method 500 for controlling secondary air introduction during stoichiometric combustion is illustrated. Method 500 may be carried out by controller 12 in response to indication that the engine is operating with stoichiometric combustion. At 502, method 500 includes determining if $NH_3$ storage levels are greater than a threshold, similar to 408 of method 400 described above. If levels are not above the threshold, method 500 proceeds to 504 to initiate an ammonia generation routine, described below with respect to FIG. 6. If the storage levels are greater than the threshold, method 500 proceeds to 506 to determine if engine temperature exceeds a first temperature threshold, T1. The first temperature threshold may be standard operating temperature, or a light-off temperature of one or more catalysts in the exhaust. If the engine is not above the threshold T1, method 500 returns until a time when the engine has reached light-off temperature. As introduction of secondary air may cool the SCR catalyst, it may not be advantageous to route the secondary air to the exhaust when engine temperature is low. While engine temperature is assessed at 506, it is to be understood that other vehicle temperatures may be assessed to determine if air is to be introduced, such as SCR catalyst temperature.

If the engine temperature is above the threshold T1, method 500 proceeds to 508 to determine if engine temperature is below a second temperature threshold, T2. The second temperature threshold may be a temperature above which the SCR catalyst is unable to store ammonia, and thus injection of secondary air may not improve NOx conversion efficiency. If the engine is above the second temperature threshold, method 500 proceeds to 510 to initiate a catalyst cooling routine, explained below with respect to FIG. 7. If the engine temperature is below the threshold, method 500 proceeds to 512 to determine if measured exhaust oxygen concentration is less than desired. If not, method 500 returns. If yes, method 500 proceeds to 514 to route secondary air to the exhaust passage, with the amount of introduced air adjusted to maintain oxygen in a threshold range at 516 (e.g., based on feedback from the oxygen sensor) and adjusted based on catalyst temperature at 518. Method 500 then returns.

FIG. 9 also depicts air injection during stoichiometric combustion. For example, at time $t_3$, the engine is operating with stoichiometric air-fuel ratio (shown in diagram 920), due to the relatively high engine load (shown in diagram 910). Air injection may be activated at time $t_3$ (shown in diagram 930) if oxygen concentration is less than desired, or if the engine undergoes an acceleration event, in order to convert any NOx that may slip past the upstream catalyst.

Figure 6:
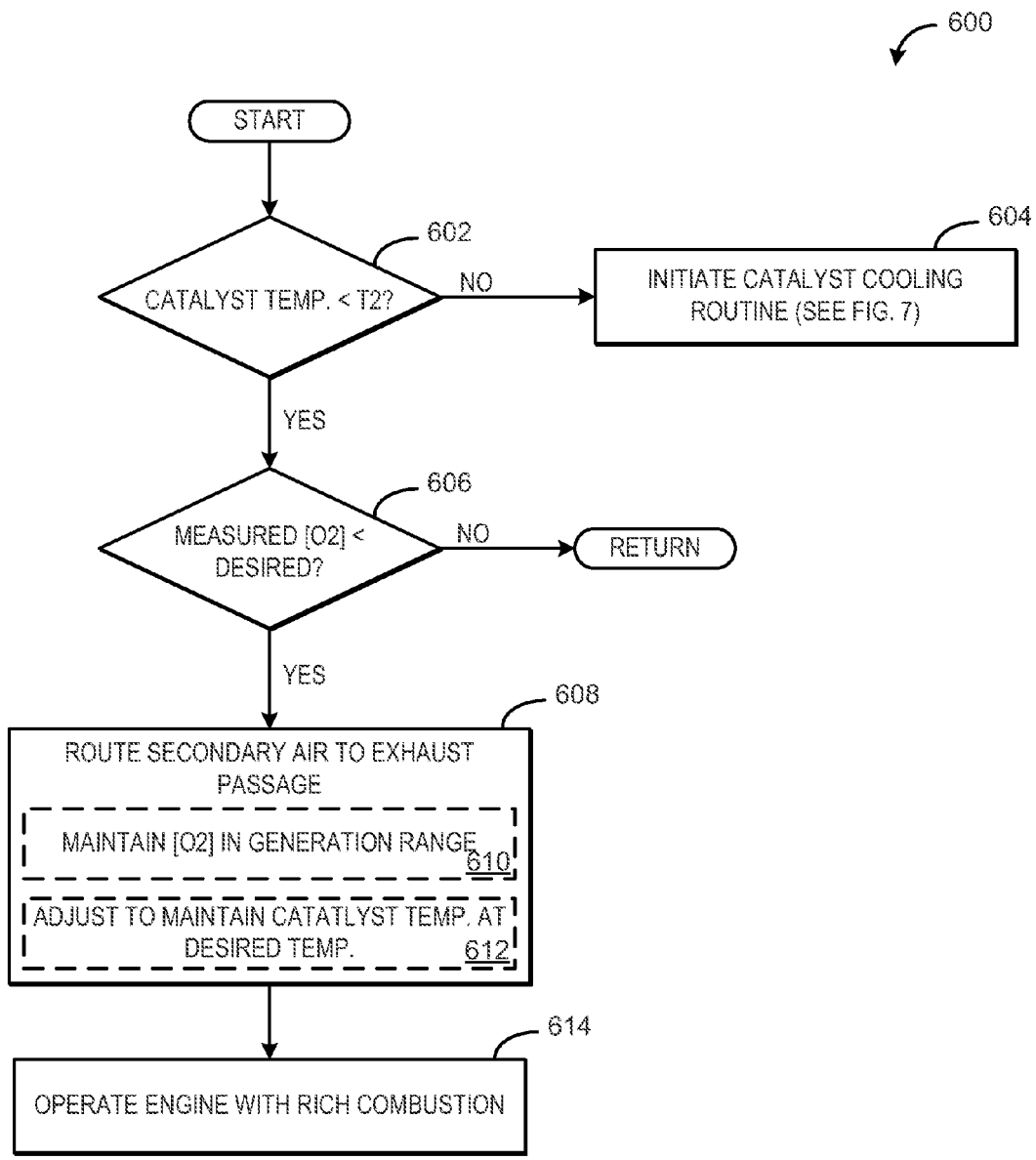
FIG. 6 shows a flow chart illustrating a method for controlling air introduction during ammonia generation according to an embodiment of the present disclosure.

FIG. 6 illustrates a method 600 for generating ammonia. Method 600 may be carried out by controller 12 in response to an indication that ammonia storage levels in the SCR catalyst are below a threshold, such as at 410 and 504 of methods 400 and 500, respectively. Method 600 includes, at 602, determining if SCR catalyst temperature is below the second temperature threshold, T2, similar to the temperature threshold T2 described above with respect to FIG. 5. SCR catalyst temperature may be determined by a temperature sensor positioned in or near the catalyst, or may be estimated based on engine temperature. If the catalyst temperature is not below the threshold T2, method 600 proceeds to 604 to initiate a catalyst cooling routine, explained below. If the catalyst temperature is below the threshold, method 600 proceeds to 606 to determine if measured oxygen concentration is below desired. The desired oxygen concentration before allowing the ammonia generation mode may be different than the desired oxygen concentration for NOx conversion during lean or stoichiometric combustion. For example, the maximum oxygen concentration during ammonia generation may be less than during lean or stoichiometric combustion. The NOx conversion in the SCR when $NH_3$ storage is low occurs with gas phase $NH_3$ rather than the stored $NH_3$, and thus lower oxygen levels may be present to avoid oxidation of the gas phase $NH_3$. Further, depending on exhaust gas composition and temperature, NOx conversion may be more efficient utilizing fuel as a reductant rather than ammonia; thus, the amount of oxygen for NOx conversion and $NH_3$ generation may vary based on whether the SCR is acting as an HC—SCR or $NH_3$—SCR.

If the measured oxygen concentration is not less than desired, method 600 returns. If it is less than desired, method 600 proceeds to 608 to route secondary air to the exhaust passage. The amount of air routed may be balanced to provide desired oxygen for NOx conversion and ammonia generation at 610 while maintaining the SCR catalyst at a desired temperature for $NH_3$ storage at 612. Additionally, at 614, the engine may be operated with rich combustion during the ammonia generation mode. Method 600 then returns.

Figure 7:
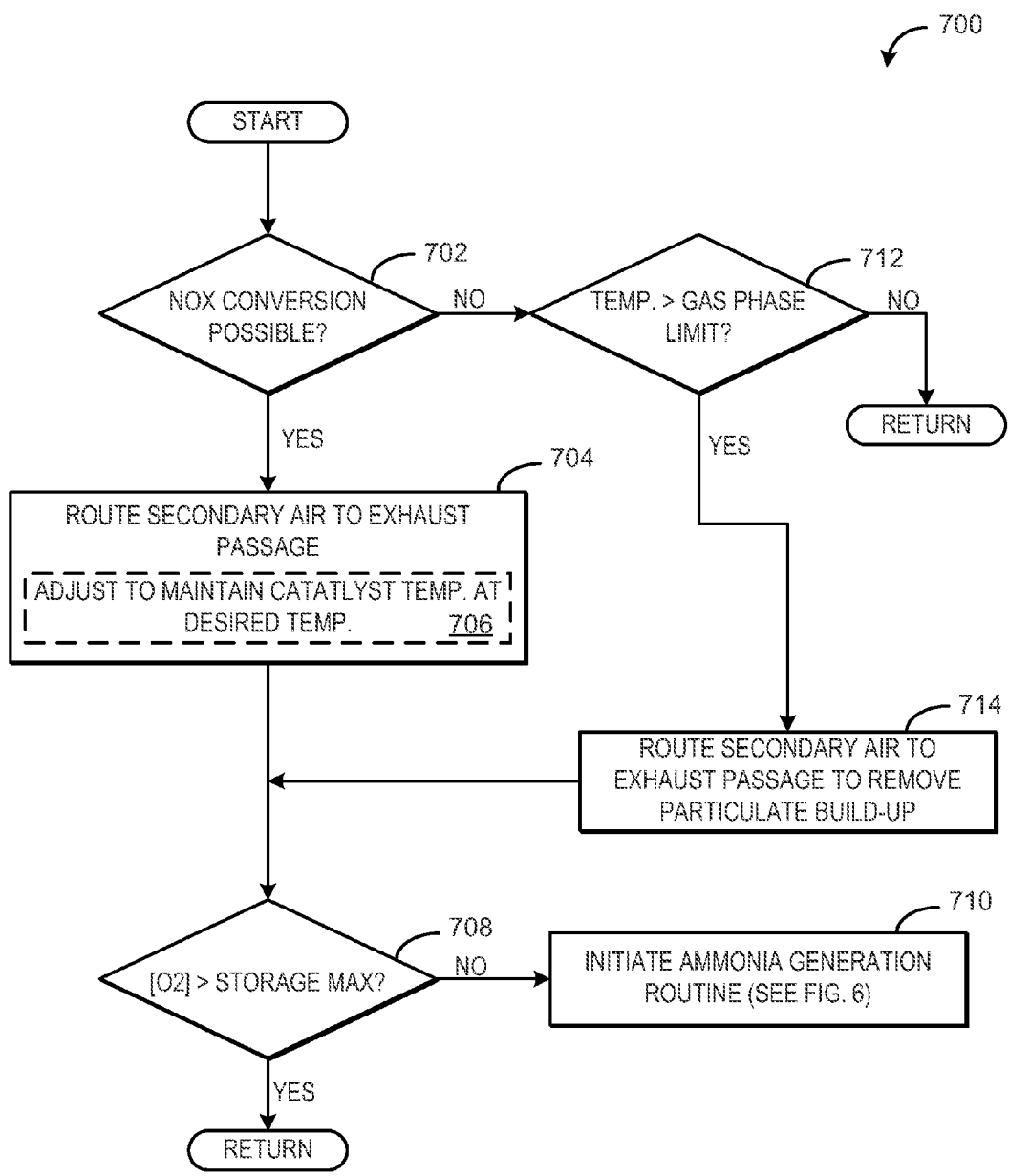
FIG. 7 shows a flow chart illustrating a method for controlling air introduction during catalyst cooling according to an embodiment of the present disclosure.

FIG. 7 is a flow chart illustrating a method 700 for cooling a catalyst using secondary air introduction. Method 700 may be carried out by controller 12 in response to an indication that the SCR catalyst is above a $NH_3$ storage temperature, such as at 510 and 604 of methods 500 and 600, respectively. Method 700 includes, at 702, determining if NOx conversion is possible with either fuel or $NH_3$ as the reductant (e.g., HC—SCR or $NH_3$—SCR). This may be based on conversion estimates determined for both HC and $NH_3$, which may in turn be based on SCR temperature, engine speed, and load. If NOx conversion is possible, method 700 proceeds to 704 to route secondary air to the exhaust for gas phase NOx conversion. The amount of air introduced may be adjusted to maintain the catalyst at a desired temperature at 706, in order to cool the catalyst to a temperature range suitable for $NH_3$ generation/storage.

At 708, method 700 includes determining if exhaust oxygen concentration is greater than a storage maximum. If the oxygen concentration in the exhaust is not greater than a storage maximum, air may be introduced to the exhaust passage to promote NH$_3$ storage, and thus method 700 proceeds to 710 to initiate the ammonia generation routine of FIG. 6. If the exhaust oxygen concentration is greater than the storage maximum, method 700 returns to continue to route secondary air to cool the catalyst.

Returning to 702, if NOx conversion is not possible at 702, due to the SCR temperature and exhaust composition, method 700 proceeds to 712 to determine if the SCR temperature is above gas phase conversion temperature limit. If not, method 700 returns. If yes, method 700 proceeds to 714 to route secondary air to the exhaust in order to remove particulate build-up from the SCR catalyst. Method 700 proceeds to 708 to determine if oxygen concentration is above the storage maximum, as explained above.

Thus, the methods of FIGS. 4-7 may provide for injecting secondary air upstream of an SCR catalyst to provide desired oxygen levels for various functions, such as NOx conversion, NH$_3$ storage, and/or assisting with catalyst regeneration. In one embodiment, an engine method comprises, operating the engine with lean combustion, and when exhaust oxygen concentration is below a threshold, injecting air into an exhaust passage between a first emission control device and a second emission control device. The first emission control device may be a two-way or three-way catalyst, and the second emission control device may be an SCR system. Operating with lean combustion may further include operating with air-fuel ratios between 20:1 and 28:1.

In some embodiments, the engine may be operated with lean combustion during first condition, and during a second condition, operated with stoichiometric combustion. In both the first and second conditions, the amount of injected air may be adjusted based on the exhaust oxygen concentration upstream of the SCR system and the temperature of the SCR system. The first condition may include low to mid engine load, and the second condition may include medium to high engine load. Further, in some embodiments, adjusting the amount of injected air may include blocking the air injection system from injecting air if exhaust oxygen concentration exceeds a first threshold or if the temperature of the SCR system exceeds a second threshold.

In another embodiment, an engine method comprises when a reductant storage level of a reduction catalyst is above a threshold, adjusting an amount of secondary air injected into an exhaust passage upstream of the reduction catalyst to maintain exhaust oxygen concentration in a first range, and when the reductant storage level is below the threshold, adjusting the amount of secondary air injected into the exhaust passage to maintain exhaust oxygen concentration in a second, lower range. The second, lower range of exhaust oxygen concentration may be based on a temperature of the reduction catalyst and the reductant storage level.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
adjusting upstream exhaust air-fuel ratio to maintain a first emission control device at or below a threshold temperature; and
responsive to the upstream exhaust air-fuel ratio below a threshold, injecting air into an exhaust passage between the first emission control device and a second emission control device to maintain downstream exhaust at a different, higher air-fuel ratio, an amount of air injected based on temperature of the second emission control device, where the injection of the amount of air is based on whether a reductant storage level of the second emission control device is above or below a threshold.

2. The engine method of claim 1, wherein injecting air into the exhaust passage further comprises routing boosted intake air directly to the exhaust passage.

3. The engine method of claim 1, wherein injecting air into the exhaust passage further comprises routing boosted intake air to the exhaust passage via an LP-EGR system.

4. The engine method of claim 3, wherein routing boosted intake air to the exhaust passage via the LP-EGR system further comprises routing boosted intake air to an LP-EGR passage upstream of an LP-EGR cooler, the LP-EGR passage coupled to the exhaust passage.

5. The engine method of claim 1, wherein the upstream exhaust air-fuel ratio comprises the air-fuel ratio of exhaust at an inlet of the first emission control device, and wherein the downstream air-fuel ratio comprises the air-fuel ratio of exhaust at an outlet of the second emission control device.

6. The engine method of claim 2, wherein an amount of the injected air is further controlled to maintain a temperature of the second emission control device within a threshold range.

7. The engine method of claim 1, wherein the threshold air-fuel ratio is stoichiometry, and wherein the threshold temperature is a maximum temperature of the first emission control device.

* * * * *